(12) United States Patent
Chang

(10) Patent No.: US 6,317,453 B1
(45) Date of Patent: Nov. 13, 2001

(54) METHOD AND APPARATUS FOR CONFIGURING PN-OFFSETS FOR A NON-UNIFORM CDMA CELLULAR NETWORK

(75) Inventor: Churui Chang, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/544,957

(22) Filed: Apr. 7, 2000

Related U.S. Application Data

(63) Continuation of application No. 08/995,510, filed on Dec. 12, 1997, now Pat. No. 6,049,564.
(60) Provisional application No. 60/045,038, filed on Apr. 28, 1997.

(51) Int. Cl.[7] .................................................. H04K 1/00
(52) U.S. Cl. ................................ 375/140; 455/446
(58) Field of Search .............................. 375/130, 140, 375/141; 455/446, 422, 522, 429, 438, 447, 448; 370/335, 342, 328

(56) References Cited

U.S. PATENT DOCUMENTS

| | | | |
|---|---|---|---|
| 4,901,307 | * 2/1990 | Gilhousen et al. | 370/320 |
| 5,193,101 | * 3/1993 | McDonald et al. | 375/130 |
| 5,504,935 | * 4/1996 | Vercauteren | 455/438 |
| 5,883,889 | * 3/1999 | Faruque | 370/335 |
| 6,049,564 | * 4/2000 | Chang Churui | 375/130 |

* cited by examiner

*Primary Examiner*—Tesfaldet Bocure
(74) *Attorney, Agent, or Firm*—Bruce Garlick

(57) ABSTRACT

A method for configuring a spread spectrum cellular network for small-cell inclusion, by providing a finite series of PN-offsets, each PN-offset is separated by a constant value that is allotted to the spread spectrum cellular network. The finite series is portioned into a first and a second set. The second set subsequent to the first set and having sufficient PN-offset elements for a PN-offset reuse pattern having a plurality of cells, each cell having similar transmission characteristics. The second set is assigned to the PN-offset reuse pattern, deploying the cellular reuse pattern for a cellular network. Small cells are insertable into the spread spectrum cellular network by assigning the first set to a PN-offset reuse pattern having a plurality of small cells arranged in a small-cell reuse pattern, and deploying the small-cell reuse pattern. In another aspect, the method for configuring the spread spectrum cellular network involves sectoring each cell of the plurality of cells into a plurality of sectors. The sectored cells are assigned PN-offsets adjacent in the finite series together in each sector of the sectored cell while maintaining sufficient distance between cells that reuse an assigned PN-offset.

8 Claims, 6 Drawing Sheets

WHERE: j IS THE TOTAL NUMBER OF ELEMENTS OF SETS S, E, AND L; AND i IS THE TOTAL NUMBER OF ELEMENTS OF SET S

METHOD AND APPARATUS FOR CONFIGURING PN-OFFSETS FOR A NON-UNIFORM CDMA CELLULAR NETWORK

RELATED APPLICATIONS

This application is a continuation of U.S. patent application Ser. No. 08/995,510, filed Dec. 22, 1997, pending on the filing date of this application, now issued as U.S. Pat. No. 6,049,564 on Apr. 11, 2000 which claimed priority to provisional application Ser. No. 60/045,038, filed Apr. 28, 1997, both of which are hereby incorporated by reference herein in their entirety.

TECHNICAL FIELD

The present invention relates to a method and apparatus for configuring Pseudo-Random Noise offsets ("PN-offsets") for a spread spectrum communications network and, more particularly, to a method and apparatus for minimizing PN-offset confusion.

BACKGROUND

Cellular communications systems technology has evolved commercially to the digital-based Code Division Multiple Access standard ("CDMA"). This standard has gradually gained acceptance over analog and narrow-band technologies because of superb characteristics in traffic capacity, voice quality, and security. For example, field tests under stressed conditions have verified CDMA predictions that cellular traffic capacities averaging fifteen times greater than analog systems are achievable.

CDMA is a "spread spectrum" technology. Information contained in a particular signal of interest is spread over a much greater bandwidth than the original signal. A CDMA cellular call starts with a standard rate of 9600 bits-per-second ("bps"). This is then spread to a transmitted rate of about 1.23 Megabits-per-second. The spread signal contains digital codes to associate the signal with users in a network cell. When the signal is received, the codes are removed from the desired signal, separating the users and returning the call to a rate of 9600 bps.

Spread spectrum communications have been traditionally used in military operations. Spread spectrum signals appear as a slight rise in the naturally occurring "white noise floor" or interference level. Accordingly, a spread spectrum signal is very difficult to jam, difficult to interfere with, and difficult to identify. In contrast, the signal power of the other transmission technologies is easier to detect and to intercept.

CDMA cellular networks are designed in conformance to the IS-95 standard established by the Telecommunications Industry Association ("TIA"). The IS-95 standard requires that the CDMA signal be Had by a Pseudo-Random noise, which is a random sequence of one and/or zero binary digits. The time duration of one binary digit is one chip. One chip is a 1,250 kHz or 0.813 micro-second segment. The IS-95 standard sets out a network Short Code chip length of $2^{15}$ chips. The IS-95 standard also establishes a minimum phase "distance" between these sites as being sixty-four or $2^6$ chips. This minimum "distance" is also referred to as a PILOT_INC constant for the network. Accordingly, the short code length of $2^{15}$ is divided by the minimum PILOT_INC constant to establish that a maximum number of $2^9$ or five-hundred and twelve PN-offsets are potentially available to a network.

Each CDMA network cell has a base transmission station ("BTS"). Each BTS distinguishes itself from other BTSs by transmitting a different phase of the CDMA Short Code at a given time. A "different phase" means a different time offset from the zero offset of the network system timing, measured in bitsper-second. This given time is the PN-offset or PN-phase for that BTS. To assure that the PN-offsets remain unique from each other, the BTSs remain synchronized to a common time reference provided by the Global Positioning System ("GPS"), a satellite-based navigation system.

Cell sites are deployed to accommodate cellular traffic density. Typically, traffic density is determined to be either dense-urban, urban, suburban, rural or highway. Dense-urban traffic is densest, and rural or highway traffic is the least dense. Coverage areas have the highest with low traffic density deploy large cells having cell radii typically attaining 15,000 meters. In comparison, coverage areas with high cellular traffic density deploy small cells having cell radii as small as 150 meters.

Conventionally, CDMA cellular networks are planned according to a predicted subscriber density population, which translates into the capacity-per-unit-area also known as Erlang units The cell radii are planned proportional to the predicted-Erlang capacity. But, cellular networks based on traffic predictions are unable to accommodate subscriber traffic density changes caused by, for example, new community developments, such as shopping mails or business districts. Once the antenna towers are built and the BTSs are installed, it is very difficult and time consuming to make significant changes in the CDMA cellular network design.

Further, the actual traffic density does not follow predicted cellular traffic patterns. Consequently, some network areas are over-designed with too much cellular coverage, while other areas are under-designed with too little coverage. Unpredictable "hot spots" and "cold spots" can occur at different locations of the network. Cells serving the hot spots are overloaded, but cells covering the cold spots are underloaded. Further, an extraordinarily high traffic density can be generated in small areas at specific times, but not all the time. For example, traffic density increases that occur during rush hour periods, traffic jams, or stadium events.

With respect to cellular infrastructure, conventional construction technologies are expensive and require a large amount of time to establish A need exists in undeveloped nations with large populations that are without existing telecommunications infrastructures. The infrastructure costs can be prohibitive and the delay for services can be five years or longer.

Thus, a need exists for a method for initially configuring PN-offsets for a CDMA cellular network for insertion of small cells into a large cell network and for insertion of large cells into small-cell networks. Furthermore, a need exists for a method and apparatus for providing configurable cellular coverage for transient traffic-densities. Also, a need exists for a configurable cellular coverage that engages wireless backhaul services for rapid deployment in areas without a telecommunications infrastructure.

SUMMARY OF THE INVENTION

Thus provided herein is a method and apparatus for configuring a spread spectrum cellular network for small-cell inclusion.

A spread spectrum cellular network has a finite series of PN-offsets. To minimize PN-offset confusion, the finite series of PN-offets is portioned into a first and a second set. The second set is allotted to a large-cell reuse pattern. The first set is allotted for present or future small-cell reuse patterns. Separating the PN-offsets minimizes the occurrence of PN-offset confusion between the large cells and the small cells. With respect to the large cell reuse pattern, PN-offset confusion is further minimized by spacing further apart the PN-offsets of the second set.

In another aspect, the method for configuring the spread spectrum cellular network involves sectoring each cell of the plurality of cells into a plurality of sectors. The sectored cells are assigned PN-offsets that are adjacent in the finite PN-offset series. The adjacent PN-offsets are assigned together in each sector of the sectored cell while maintaining sufficient distance between cells that reuse an assigned PN-offset.

Also provided herein is a method of inserting a plurality of small cells into a spread spectrum cellular network, deploying a plurality of mobile small cells in a small-cell reuse pattern in the coverage hole, and transferring a plurality of cellular traffic to the deployed mobile small cells.

BRIEF DESCRIPTION OF THE DRAWING

For a more complete understanding of the present invention, and the advantages thereof, reference is made to the following description taken in conjunction with the accompanying drawings, wherein.

DETAILED DESCRIPTION

The principles of the present invention and their advantages are best understood by referring to the illustrated embodiment depicted in the FIGURES, in which like reference numbers describe like parts.

Planning a CDMA network requires minimizing interference or confusion between the individual BTS signals. The basis for signal differentiation in a CDMA network are the PN-offsets. PN-offset confusion has at least two components: co-PN-offset confusion, andlor adjacent PN-offset confusion. The PN-offset may also be referred to as the PN-phase.

Each CDMA network cell has a base transmission station ("BTS"). Each BTS distinguishes itself from other BTSs by transmitting different phases of the CDMA Short Code at a given time. This given time is the PN-offset of PN-offset for that BTS.

Figure 1A:
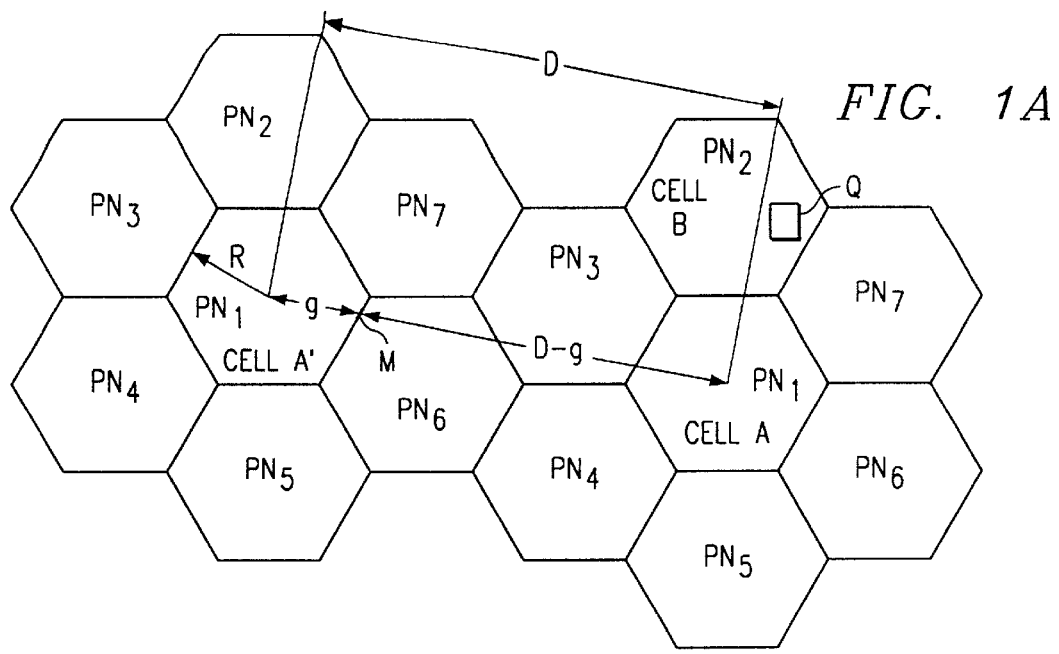
FIG. 1A is an illustration of an over-simplified spread-spectrum cellular network layout with reuse patterns depicting a network reuse distance.

FIG. 1 shows two contiguous copies of a multiple-cell cluster 2. In this example, the reuse pattern has a repeat value, k, equal to seven cells, which is less than commonly deployed to better illustrate application of the invention to CDMA networks. An example of an average cluster reuse size, k, is from twenty-seven to thirty-seven cells per cluster. These clusters are reused as "building blocks" to form a replicating pattern, or cell reuse pattern, over an arbitrarily large cellular coverage area 4.

The magnitude of reuse distance D between clusters, in combination with the cell search window of the two cells, affect the likelihood of co-PN-offset confusion. For example, in FIG. 1A, Cell A and Cell A' are assigned the same PN-offset $PN_1$. Cells A and A' are separated by a reuse distance D.

In uniform CDMA cellular networks having primarily either large cells or small cells, coPN-offset confusion is avoided by selecting a reuse distance based on a search window $W_A$ so that any affect of propagation phase-delay on a remote co-PN signal will fall outside the search window $W_A$. The search window $W_A$ is a time value, measured in chip units, in which a mobile unit M will search for the presence of PN-offsets transmitted by the pertinent BTS. The term "mobile" as used herein means any subscriber station, movable or otherwise.

The worst case scenario is that a mobile unit M is between Cell A and Cell A'. Assuming the distance of the mobile unit M to the home Cell A' is "g", the mobile unit M distance to remote Cell A is "D minus g."

Figure 1B:
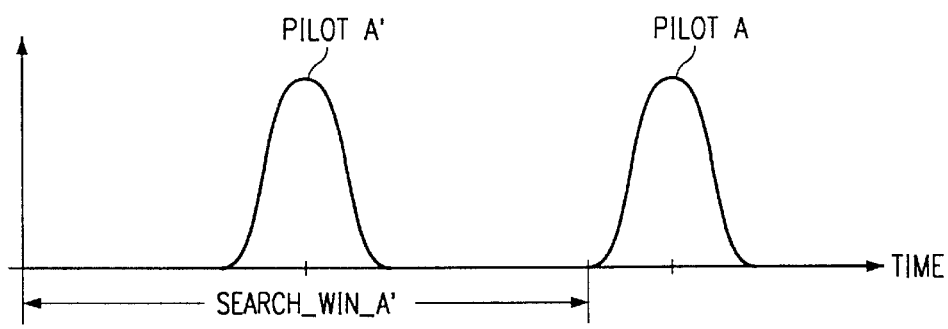
FIG. 1B is an illustration of a search window for Cell A'.

In FIG. 1B, shown is a search window value SEARCH_WIN_A' for Cell A'. Cell A' has a PN-offset value of Pilot A' and Cell A has a PN-offset value of Pilot A. To ensure that remote Cell A falls out of the Active Set Search Window of home Cell A' for the mobile unit M, the minimum required reuse distance is:

$$D - g \geq W_A/2$$

So long as a sufficient reuse distance is deployed in a substantially uniform network, then the co-PN-offset confusion problem in the active set is not only minimized but avoided altogether. It should be noted that there are four set-types as defined under the IS-95 standard: an active set, a candidate set, a neighbor set, and a remaining set.

Figure 2:
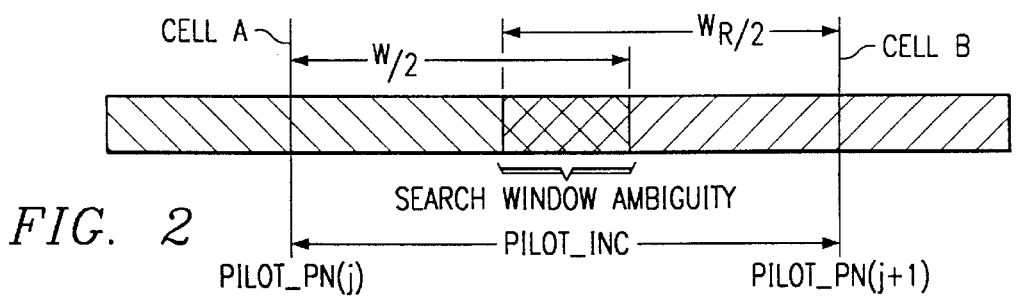
FIG. 2 is a graphical illustration of an upper-bound search window size for determining a N{$W_N$, $W_R$} parameter to avoid a search window overlap.

Referring to FIG. 2, adjacent PN-offset confusion can arise from sufficiently large propagation delay over large distances, such that the phase at the mobile M mistakenly looks like a later PN-offset or phase.

With respect to adjacent PN-offset confusion, the network parameter of concern is the PILOT_INC constant. PILOT_INC constant is the separation in phase or "distance" in phase-space between two adjacent PN-offsets. The PN-offset series available for a CDMA network is established in part by the IS-95 standard.

Under the IS-95 standard, the minimum PN-offset separation is sixty-four chips. Thus, a cellular network having a PILOT_INC constant of unity or "one" has available a PN-offset series of five-hundred and twelve PN-offsets. Generally, it is preferable to have a PILOT_INC constant greater than one. The preferred value is typically 3 or 4. The term "series" as used herein means a number of PN-offset values coming one after another in a spatial or temporal succession. The PILOT_INC constant is selected to minimize adjacent PN-offset confusion.

1. Upper Bounds of the Search Window Size.

Still referring to FIG. 2, shown is a condition for adjacent PN-offset confusion caused by search window ambiguity. CDMA Cell A has a PN-offset $PN_1$ equal to PILOT_PN(j). CDMA Cell B has a PN-offset $PN_2$ equal to PILOT_PN(j+1). The letter j indicates a series of PN-offsets of j,j+1, j+2, up to the maximum number of offsets available under the applicable CDMA standard. PN-offset $PN_2$ is adjacent and later in time to PN-offset $PN_1$. The PN-offsets $PN_1$ and $PN_2$ are separated by the cellular network constant PILOT_INC, discussed above.

Assume the neighbor set or the remaining set have search windows $W_N$ or $W_R$, respectively, the relationship of the PILOT_INC constant with respect to these search windows, in chip units, is:

$$(\text{PILOT\_INC})*(64 \text{ chips}) > \max\{W_N, W_R\}$$

If this condition is violated, the two adjacent search windows will overlap, creating a search window ambiguity, as shown in FIG. 2. The ambiguity between the two adjacent cells occurs because the measured value of the transmitted signal "belongs" to both search windows.

2. PN-Phase Confusion Caused by Propagation Delay

As discussed above, although the search window ambiguity is minimized by the appropriate selection of the PILOT_INC constant, adjacent PN-offset confusion can also arise from propagation phase delay.

Generally, the greater the distance a signal travels, the greater the phase delay of the BTS signal. The RF signal propagation delay is about two-hundred and forty-four meters per chip. With enough phase delay, the PN-offset PN(j) of the remote cell, and the PN-offset PNO(j+1) of the home cell, could appear similar to mobile unit Q (see FIG. 1). If the PN-offsets are both in the same search window, for example, $W_N$, then adjacent PN-phase confusion would occur.

Figure 3A:
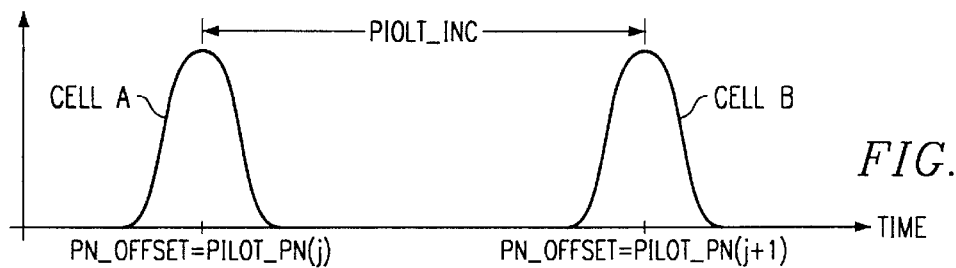
FIGS. 3A and 3B are graphical illustrations used to explain how propagation delay causes adjacent PN-offset confusion.
Figure 3B:
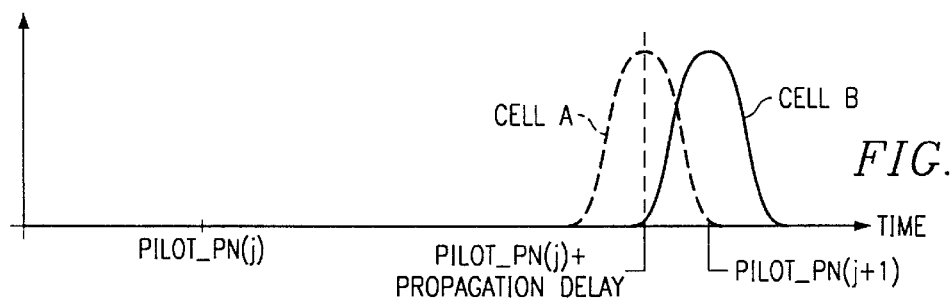

Referring to FIGS. 3A and 3B, time line representations of adjacent PN-offset confusion between Cell A and Cell B is illustrated.

In FIG. 3A, the PN-offset of Cell A is $PN_1$ or PILOT_PN(j). Cell B has a later adjacent PN-offset value of $PN_2$ or PILOT_PN(j+1), which is separated from $PN_1$ by the PILOT_INC constant Referring to FIG. 3B, the effect of propagation delay distortion on the PN-offset of Cell A is illustrated. As the BTS signal from Cell A travels to mobile unit Q (shown in FIG. 1), the propagation delay distortion causes the BTS signal to lag. As the propagation delay increases, the signal from Cell A perceived at the mobile unit Q is:

$$(\text{PILOT\_PN}(j) + \text{propagation delay}) = \text{PILOT\_PN}(j+1)$$

In designing a CDMA network, adjacent PN-offset confusion caused by propagation delay can be avoided(1) if the phase separation is larger than the difference in propagation delay, or (2) if the remote signal is at least 21 dB weaker than the home signal.

The selection of a PILOT_INC constant using the two conditions above avoids adjacent PN-offset confusion. As an example, assume the maximum CDMA cell radius is 15 km (61 chips). The propagation path loss exponent, α, is 3.2. The minimum PN separation, ΔPN, is proportional to the cell radius R, as expressed in the formula (in chip units):

$$\Delta PN > (R)(10^{21/10} - 1)$$

Applying the given variable values:

$$\Delta PN > 61(10^{21/(10\times 3.2)} - 1)$$

the minimum PILOT_INC constant for the network is governed by the following relationship:

$$\Delta PN = (\text{PILOT\_INC})(64 \text{ chips}) - (W_A/2) > 216$$

If the search window $W_N$ is twenty-eight chips, then from the equation above, the minimum PILOT_INC constant is:

$$((\text{PILOT\_INC})(64 \text{ chips}) - W_A/2) > 216$$

with the given variable values:

$$((\text{PILOT\_INC})(64 \text{ chips}) - (28/2)) > 216$$

The network relationship is:

$$\text{PILOT\_INC} > 3.59$$

Because the PILOT_INC constant is an integer value, the minimum PILOT_INC constant in this example is "three" to avoid adjacent PN-phase confusion Thus, the total number of available valid PN-offset series for this example has 512/(PILOT_INC), or about one-hundred seventy possible PN-offsets. The PILOT_INC constant can be smaller for smaller cell radii.

Figure 4:
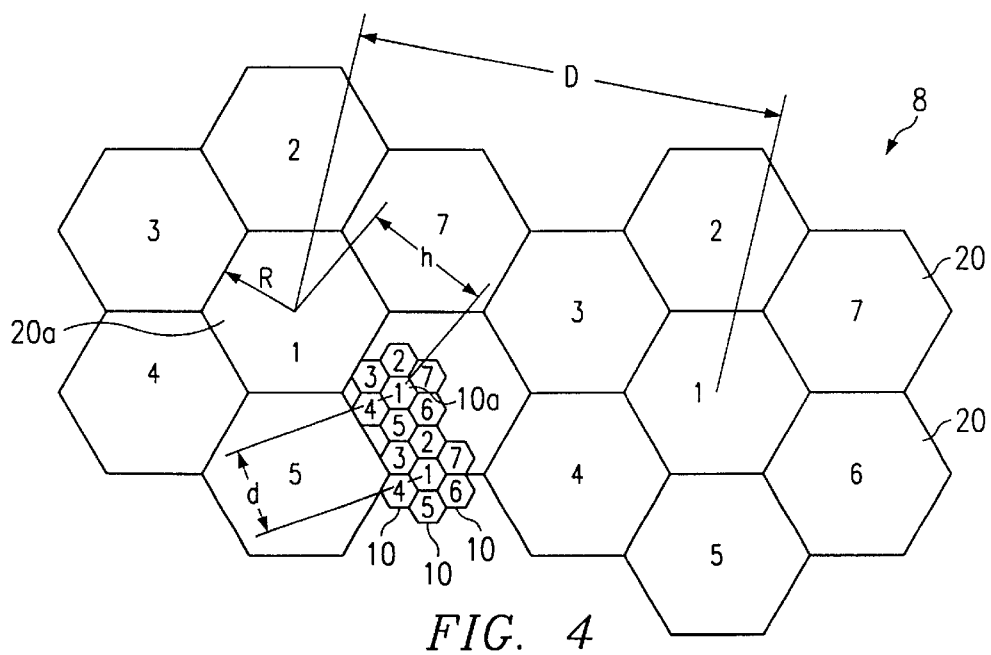
FIG. 4 is an illustration of a non-uniform spread spectrum cellular network layout with small cells inserted into a large cell network.

As stated previously, an initial CDMA cellular network 8 is designed with respect to predicted cellular traffic density loads. For simplicity, the network 8 illustrated in FIG. 4 initially contains cells of the same size, which are referred to as large cells 20. The large cells 20 can accommodate rural and highway cellular traffic densities.

As cellular traffic density loads increase over time, there is a need to install dense-urban, urban, or suburban traffic capacity cells into the pre-existing cellular network 8. For clarity, these insertable cells are referred to as small cells 10, which have smaller cell radii and greater traffic capacity tan& the large cells 20.

Planning the PN-offsets for a CDMA cellular system having both high traffic density cells and lower traffic density cells is complicated by the close geographic proximity of these dissimilar cells to each other. For large cells 20, the reuse distance is D, which for a repeat pattern of k=7, is 4.6 times the radius R of the large cell 20, and among small cells, the reuse distance is d, which for a repeat pattern of k=7, is 4.6 times the radius r of the small cell 10. Accordingly, PN-offset confusion problems arise when the small cells 10 are inserted, or are closely proximate to, the large cells 20. For example, referring to FIG. 4, the large cell 20a and the small cell 10a are shown as being within a distance h, which is less than the reuse distance D for the large cells 20.

Accordingly, design techniques to reduce PN-offset confusion are needed to be modified to accomodate non-uniform CDMA networks. A non-uniform CDMA network is one that has small cells 10 and large cells 20 to accomodate different traffic load densities.

A non-uniform CDMA network is needed when the cellular traffic density for a region is non-uniform. Different characteristics between the types of cells requires an additional level of layout planning to avoid PN-offset confusion problems in the network at the time of installation or at a later time when the small cells 10 would be added.

For example, adjacent PN-offset confusion problem is more likely in large cells 20 where propagation delay is large. Therefore, a large PILOT_INC constant is used in large cells 20 to avoid adjacent PN-offset confusion On the other hand, co-PN-offset confusion is a major problem with small cells 10 because the distance between cells with the same PN-offset is small.

If a large PILOT_INC constant is used to separate the PN-offsets to avoid adjacent PN-offset confusion, then the total number of valid PN-offsets is insufficient to accommodate the small cells 10. Another problem is that if a small value of the PILOT_INC constant is used to create enough valid PN-offsets for the small cells, then the separation between the PN-offsets is insufficient to avoid adjacent PN-offset confusion in large cells 20.

The number of small cells 10 per cell reuse pattern is higher than that for large cells 20, since small cells are denser and more vulnerable to co-PN-offset confusion. Usually, the cell reuse pattern for small cells is from about twenty-seven to thirty-four cells per cluster. For large cells, the number of cells per cell reuse pattern can be smaller; usually, a sufficient reuse pattern for large cells has from about seven to twelve cells per cell reuse pattern.

Generally, large cells 20 require a larger "time separation" obtained with the larger PILOT_INC constant because of the propagation phase delay problem. But small cells 10 can have smaller "time separation" because a CDMA small-cell signal travels comparatively short distances, and thus are not susceptible to appreciable propagation delay distortion.

However, small cells 10 are more vulnerable to co-PN-offset confusion since the reuse distance d is less than the reuse distance D for large cells 20. In comparison, signals from large cells 20 travel greater distances, causing large cells 20 to be more susceptible to adjacent PN-offset confusion, as illustrated in FIGS. 3A and 3B.

This dilemma is addressed by first designing the PILOT_INC constant for the small cells 10. Then, every other (or more) PNoffset for large cells 20 is skipped. That is, the large cell 20 separation is at least two times PILOT_INC. For example, if the PILOT_INC constant for the small cells 10 is equal to thee, then the effective time separation for the large cells 20 is six.

Figure 5:
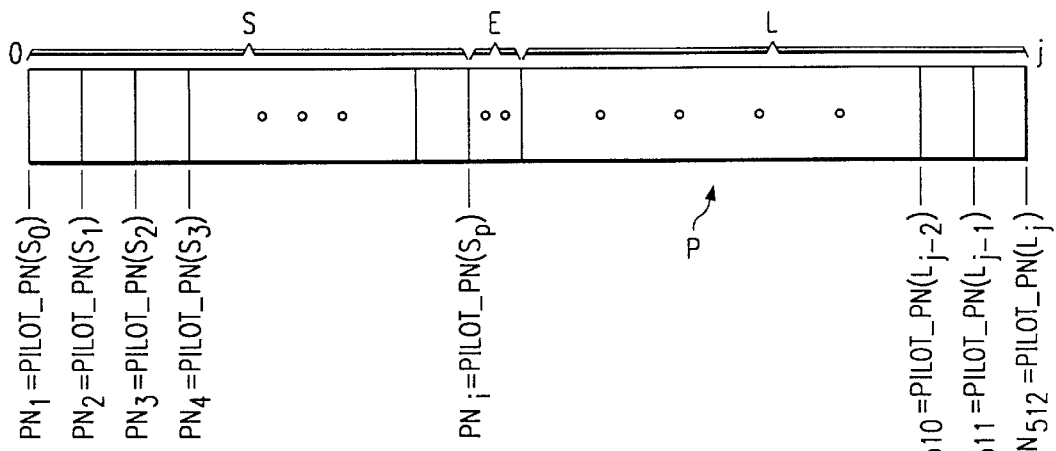
FIG. 5 is an example depicting a time-line used in explaining a PN-offset series apportioned into a first set disjointed with a second set of PN-offsets.

Referring to FIG. 5, the PN-offset series P is separated into a first set S for small cells 10 and a second set L for large cells 20. A buffer E is between set S and set L for future PN-offset assignment as needed Set S has a plurality of PN-offsets from zero to i, where i is the total number of PN-offset elements. Set L has a plurality of PN-offsets from i to j, where j is the total number of PN-offsets in the series P. Thus, there may occur an instance in which the number of PN-offsets in buffer set E is zero because these PN-offsets have been apportioned between the first set S and the second set L.

For further minimizing adjacent PN-offset confusion, the second set L is subsequent to the first set S. Because large cells 20 have tall antennas, the signal from the large cells 20 can propagate much farther than signals from small cells 10, which have comparatively low antennas. Also, the first set S and the second set L are not necessarily positioned with origins at the maximum and minimum thresholds of the PN-offset series P.

Adjacent PN-offset confusion is further minimized by multiplying the separation PILOT_INC constant for the second set L by a "propagation_factor." This constant has a value greater than one ("unity").

Thus, for example, if the PILOT_INC constant is three, the first set S has a PN-offset separation of "PILOT_INC," and the second set L PN-offset separation is (PILOT INC)*(propagation_factor). When the propagation_factor is two, then the PILOT_INC constant separation is (2)(3)(64 chips) chips for the second set L. The propagation_factor can be greater than two, but to allow sufficient PN-offset values in the second set L, a propagation_factor of two is preferred.

Figure 6A:
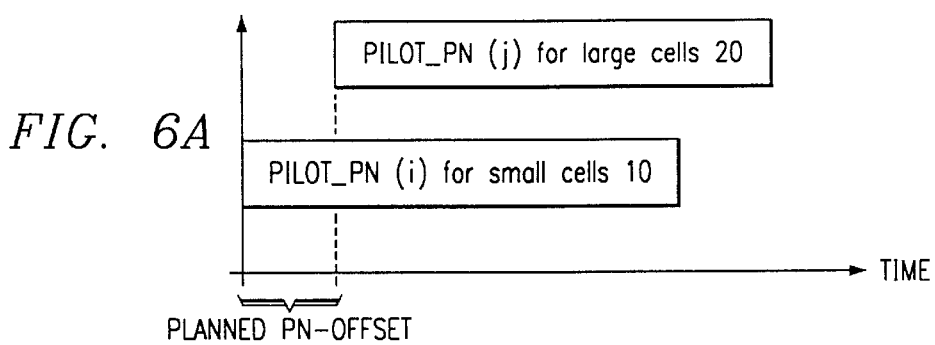
FIGS. 6A and 6B are graphical illustrations of the propagation-phase-delay benefit resulting from an aspect of the invention by assigning a second or later set of PN-offsets to large cells.
Figure 6B:
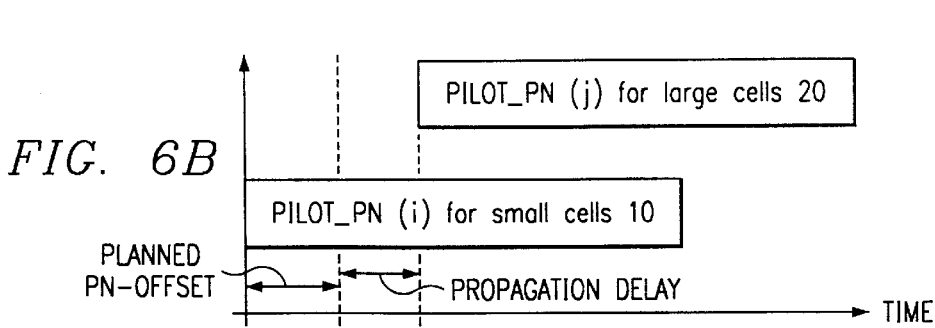

In FIGS. 6A and 6B, the effect of a propagation delay on the large cells 20 as compared to the small cells 10 is illustrated.

Referring to FIG. 6A, an example of allocating a subsequent PN-offset PILOT_PN(j) from the second set L to a large cell and a prior PN-offset PILOT_PN(i) from the first set S to the small cell 10. Adjacent PN-offset confusion is likely to occur with the cell having the earlier PN-offset and that has the large-cell radius. Thus, to further minimize the occurrence of adjacent PN-offset confusion, the large cells 20 are given "later phase" PN-offsets. Thus, if propagation delay occurs, the effective separation between the small cell PN-offset PILOT_PN(i) and the large cell PN-offset PILOT_PN(j) increases, as illustrated in FIG. 6B.

Traditional adjacent channel interference planning techniques for sectored cells promulgated the rule that adjacent frequency channels could not be allocated to the adjacent BTS sectors. As an example, the adjacent frequencies $f_1$, $f_2$, and $f_3$, would not be allocated to the same BTS for fear of adjacent channel interference. Such dispersement of frequencies complicates the "frequency planning" of narrow-band cellular networks in terms of frequency reuse and co-channel interference, discussed later herein.

Figure 7:
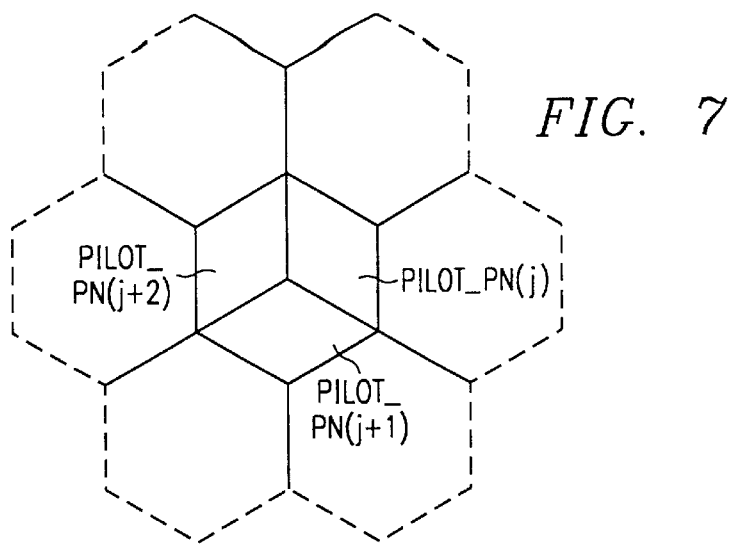
FIG. 7 is an illustration of a sectored cell where adjacent PN-offsets are assigned to adjacent sectors in accordance with the invention.

In FIG. 7, a sectored cell is shown. In PN-offset planning, in contrast to RF cell planning, adjacent PN-offset confusion is further minimized by allocating adjacent PN-offsets to the adjacent CDMA BTS sectors. This is opposite to techniques used in frequency planning.

Under a CDMA cellular system, a large difference in path delay must occur for adjacent PN-offset confusion to occur. Accordingly, it is least likely for two adjacent pilots, for example, PILOT_PN(j) and PILOT_PN(j+1), from adjacent sectors to produce a large path difference, because both signals are initiated from the same point (that is, the same BTS). Also, the sectors are oriented in differing directions. For example, the sectors of a three-sector cell are arranged in 120-degree orientations, as illustrated in FIG. 7. For an adjacent PN-offset confusion to occur, the signal must propagate in a large signal path such that it is received by an adjacent CDMA sector in the cell.

The PN-offset planning described above can be implemented in a computer program for execution on a standard computer. The computer program can be implemented using a suitable computer programming language such as C, C++, Pascal, or the like. A suitable computer includes a central processing unit ("CPU") with a microprocessor coupled to main memory and program memory (such as Read Only Memory or Random Access Memory). Computer input and output is displayed on a computer monitor through a graphic user interface or other such interface program. User input is provided through a keyboard, a mouse or track ball, or other standard input devices. The computer is conventional, and may be a microprocessor system, a workstation, or networked terminal system, or any of a variety of other apparatus providing computing and input/output capabilities. Preferably, the computer is a BP-UX workstation available from Hewlett-Packard of Palo Alto, Calif.

Figures 8A, 8B:
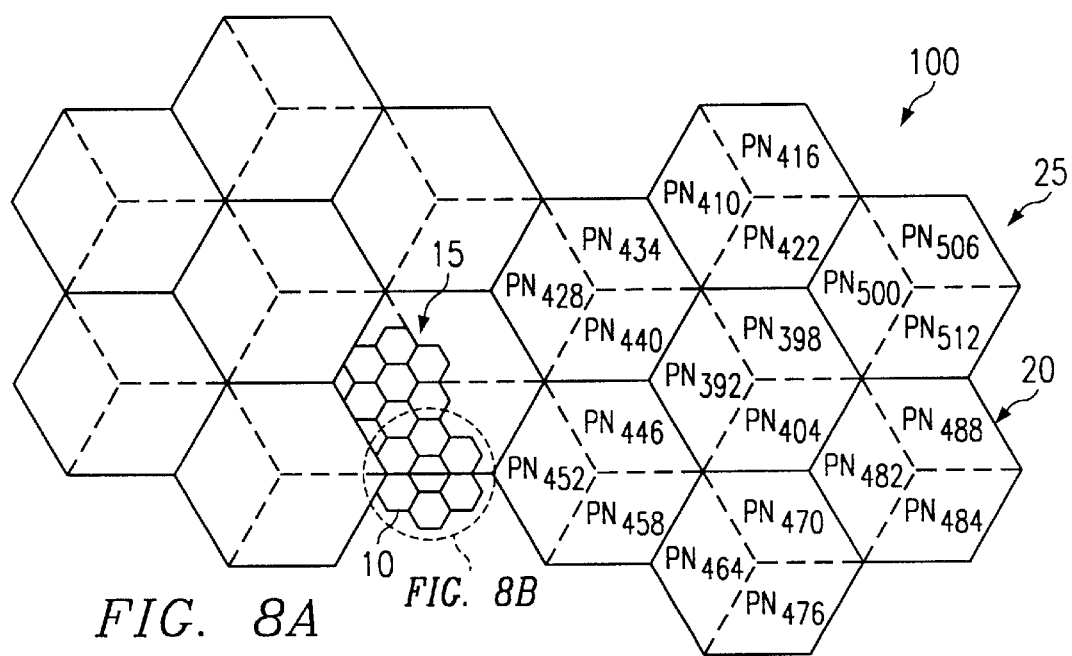
FIGS. 8A and 8B are illustrations of the application of the invention for insertion of a plurality of small cells forming a heterogeneous cellular network.
Figure 8B:
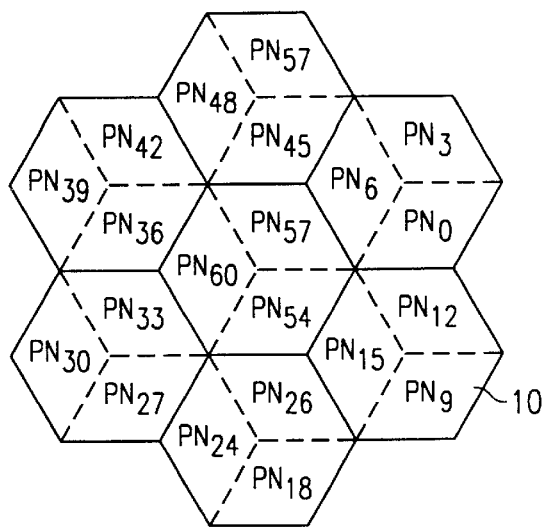

An example showing use of the planning methods for a CDMA cellular network is illustrated in FIGS. 8A and 8B.

It should be noted that the simplified deployment shown is for demonstration purposes to provide clarity as to the use of the invention disclosed herein. The parameters used for this example are:

PILOT_INC=3, and propagation_factor=2.

Applying these parameters, the CDMA network 100 has a PN-offset configuration implemented through the PN-offset series P having two sets S and L. With the PILOT_INC constant given above, about one-hundred seventy PN-offsets are available to the network 100.

The large-cell reuse pattern 25 has seven cells. For clarity, the small-cell reuse pattern 15 has seven cells instead of the conventional twenty-seven cells. The small-cell reuse pattern is shown greater detail in FIG. 8B.

The first PN-offset set S is deployed in the small-cell reuse pattern 15. If the small-cell reuse pattern had twenty-seven cells, then the PN-offsets deployed are from PN, through $PN_{243}$ (spaced by the PILOT_INC constant designated above). With a seven-cell reuse pattern of the example shown in FIGS. 8A and 8B, the range of PN-offsets deployed from the small cells 10 is from $PN_1$ through $PN_{63}$.

The second PN-offset set L is deployed in the large-cell reuse pattern 25. The PN-offsets deployed are from $PN_{449}$ through $PN_{512}$.

The buffer space E between first set S and second set L occupies PN-offsets from $PN_{82}$ through $PN_L$.

Accordingly, the first set S and the second set L can be expanded to accommodate additional cells in reuse patterns to the point where no PN-offsets are allotted to the buffer space E.

The CDMA network can be planned with either small cells 10 or large cells 20. If a large-cell network is desired, then the PN-offsets $PN_{107}$ through $PN_{128}$ are deployed. The PN-offsets of the first set S and the buffer space E are reserved for future deployment If a small-cell network is desired, then the PN-offsets $PN_1$ through $PN_{81}$ are deployed. Similarly, the PN-offsets for the second set L and the buffer space E are reserved for future deployment.

In this manner, a great deal of flexibility is realized, allowing accommodation of traffic density fluctuations within the CDMA network that depart from the traffic density load predictions. Accordingly, a non-uniform CDMA network can be implemented without any substantial re-design of the existing CDMA network.

By initially configuring the CDMA cellular network for present or contingent non-uniform CDMA networks having small cells and large cells, movable base transmitter stations (BTS) or fixed-BTS can be placed in the cellular network to accommodate traffic density changes.

Figure 9:
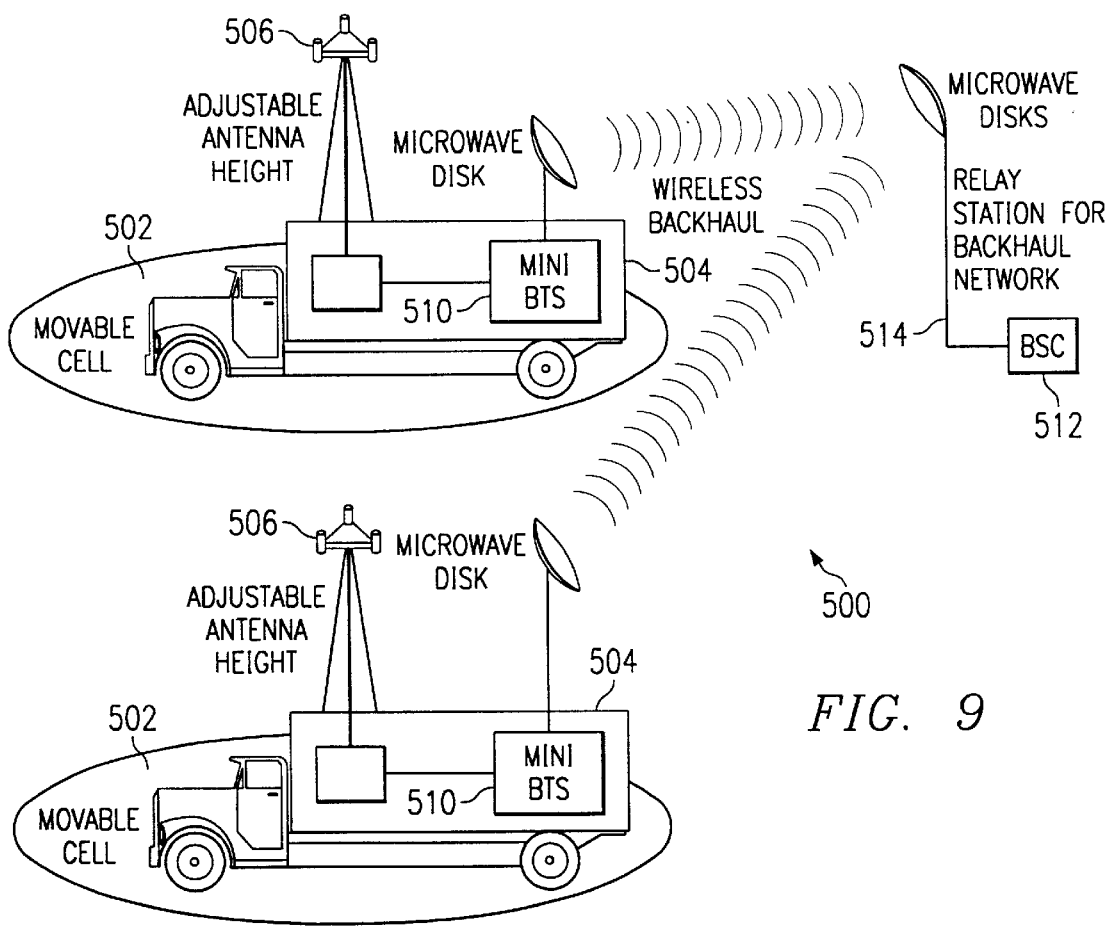
FIG. 9 is a depiction of a configurable network having a plurality of movable CDMA cells.
Figure 10:
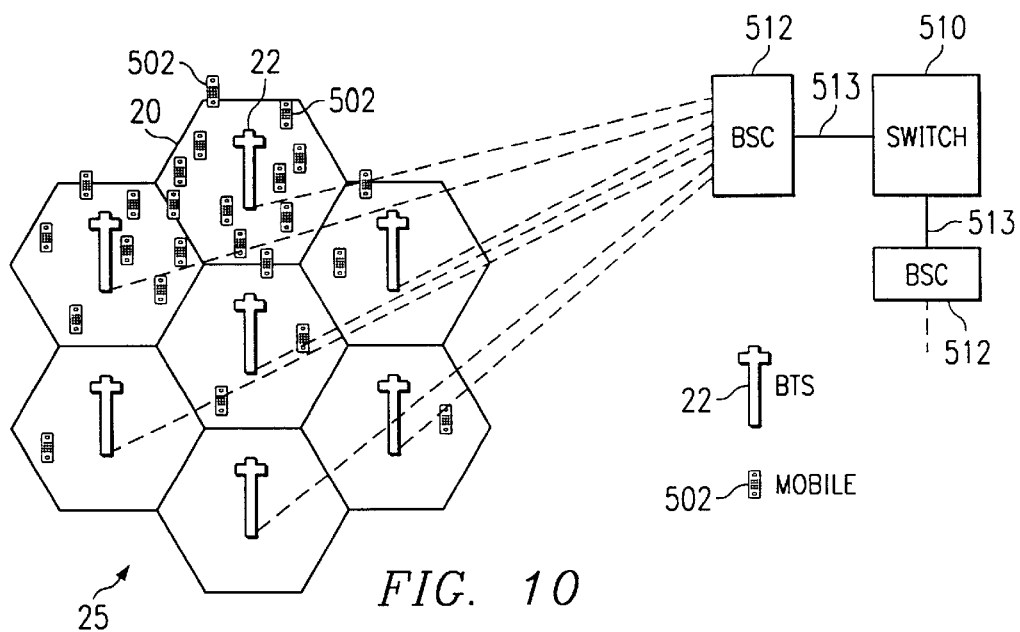
FIG. 10 is a depiction of a cellular network portion arranged in communication through a communications backhaul network to a BSC and a telecommunications switch.

Referring to FIGS. 9 and 10, a re-configurable network 500 is shown The network 500 has a plurality of movable CDMA cells 502. The movable cells 502 each have a vehicle 504 with an adjustable-height antenna 506. The antenna 506 is electrically-coupled to a mini-BTS 510. The mini-BTS 510 is in communication with a base switch ("BSC") 512 through a backhaul network 514. The BSC 512 provides control commands to the BTS to reduce the loading on the telecommunications switch. The traffic routed through the telecommunications switch is preferably limited to true voice/data traffic. The backhaul network 514 can be a communication medium such as microwave, satellite, RF, or the like. Preferably, the communication medium is a form of wireless transmission to provide mobile placement of the movable CDMA cells 502.

The insertion of a small-cell cluster with the movable CDMA cells is a gradual process such that no service interruption is needed for the insertion. Referring to FIG. 10, a CDMA network having large cells 20 with BTS 22 is illustrated. Dispersed through the network are movable CDMA small cells 502. As illustrated, he small cells 502 are in an inactive state and the large cells 20 are in an active state.

Figure 11:
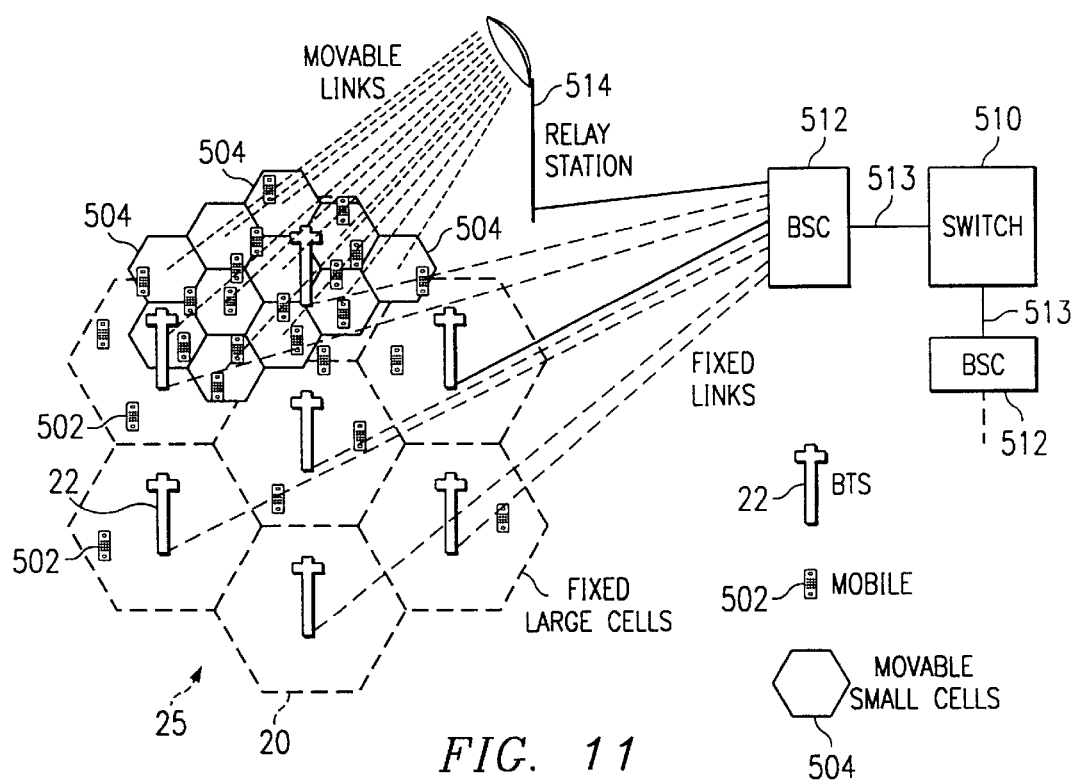
FIG. 11 is a depiction of the configurable network deploying the movable CDMA small cells of the present invention for iron in the network of FIG. 10.

Referring to FIG. 11, insertion of the small cells 20 is illustrated. The transmit power of the fixed-large cell BTSs that cover traffic density "hot spots" is gradually reduced, and the fixed-large-cell receiver is de-sensitized. As a result, a coverage "hole"near the "hot spot" is created so that the fixed large-cell is gradually relieved or released from the traffic loading of the "hot spot." Accordingly, the service is transferred to the small-cell group having the capacity to service the hot spot.

In a further aspect, the portable cellular network has a wireless backhaul network. Such networks provide a further level of portability that extends to the entire network.

With movable cells and re-configurable networks, a wireless network can be created within a short time in comparison to fixed network-infrastructures common today. The backhaul network 514 between the BTS and the BCS is preferably implemented with a microwave connections The backhaul network 513 between the BCS and the telecommunications switch can be implemented with either a microwave or a satellite connection. Because local call traffic and control commands are handled by the cellular portion of the network though BSCs, the satellite load links is significantly reduced and the network can handle much higher capacity.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A method for configuring a spread spectrum cellular network, the method comprising the steps of:

providing a finite series of PN-offsets, each of the PN-offsets being separated by a value that is determined for the spread spectrum cellular network;

portioning the finite series of PN-offsets into a first and a second set, the second set subsequent to the first set and having sufficient PN-offset elements for a PN-offset reuse pattern having a plurality of cells;

assigning the first set to a first PN-offset reuse pattern, wherein the first PN-reuse pattern is employed for with a plurality of groups of a plurality of small cells; and assigning the second set to a second PN-offset muse pattern, the second PN-offset reuse pattern coexistent with the first PN-offset reuse pattern, wherein the second PN-reuse pattern is employed for a plurality of groups of a plurality of large cells sharing a service coverage area with the plurality of groups of a plurality of small cells.

2. The method of claim 1 wherein:

the first PN-reuse pattern has a first spacing between PN-offsets;

the second PN-reuse pattern has a second spacing between PN-offsets; and the second spacing is greater than the first spacing.

3. The method of claim 1 further comprising:

sectoring each small cell into a plurality of small cell sectors; and assigning PN-offsets adjacent in the finite series to adjacent small cell sectors while maintaining sufficient distance between cells that reuse an assigned PN-offset.

4. The method of claim 1 further comprising:

sectoring each large cell into a plurality of large cell sectors; and assigning PN-offsets adjacent in the finite series to adjacent large cell sectors while maintaining sufficient distance between cells that reuse an assigned PN-offset.

5. A spread spectrum cellular communication system comprising:

a first plurality of base stations, each servicing a small cell;

a second plurality of base stations, each servicing a large cell;

wherein each of the first plurality of base stations employs a PN-offset taken from a first PN-offset reuse pattern;

wherein each of the second plurality of base stations employs a PN-offset taken from a second PN-offset reuse pattern;

wherein the first PN-reuse pattern and the second PN-reuse pattern together form a finite series of PN-offsets, wherein the PN-offsets of the finite series of PN-offsets are separated by a value that is determined for the spread spectrum cellular network; and wherein the plurality of groups of the plurality of large cells share a service coverage area with the plurality of groups of the plurality of small cells.

6. The spread spectrum cellular communication system of claim 5, wherein:

the first PN-reuse pattern has a first spacing between PN-offsets;

the second PN-reuse pattern has a second spacing between PN-offsets; and the second spacing is greater than the first spacing.

7. The spread spectrum cellular communication system of claim 5, wherein:

some of the small cells are sectored into a plurality of small cell sectors; and adjacent small cell sectors are assigned PN-offsets that are adjacent in the finite series while sufficient distance between cells that reuse an assigned PN-offset are maintained.

8. The spread spectrum cellular communication system of claim 5, wherein:

some of the large cells are sectored into a plurality of large cell sectors; and adjacent large cell sectors are assigned PN-offsets that are adjacent in the finite series while sufficient distance between cells that reuse an assigned PN-offset are maintained.

* * * * *